(12) United States Patent (10) Patent No.: US 12,626,435 B2
Gerhard et al. (45) Date of Patent: May 12, 2026

(54) VIDEO PLAYBACK RECOGNITION APPARATUS AND METHOD

(71) Applicant: PlayFusion Limited, Cambridge (GB)

(72) Inventors: Mark Michael Gerhard, Cambridge (GB); Riaan Henning Hodgson, Cambridge (GB); David Gomberg, Cambridge (GB)

(73) Assignee: PlayFusion Limited, Cambridge (GB)

( * ) Notice: Subject to any disclaimer, the term of this patent is extended or adjusted under 35 U.S.C. 154(b) by 285 days.

(21) Appl. No.: 18/477,938

(22) Filed: Sep. 29, 2023

(65) Prior Publication Data

US 2025/0111563 A1 Apr. 3, 2025

(51) Int. Cl.
*G06T 11/60* (2026.01)
*G06F 3/14* (2006.01)
*G06T 7/13* (2017.01)
*G06V 10/74* (2022.01)

(52) U.S. Cl.
CPC ................ *G06T 11/60* (2013.01); *G06F 3/14* (2013.01); *G06T 7/13* (2017.01); *G06V 10/761* (2022.01); *G06T 2207/20084* (2013.01); *G06T 2207/20132* (2013.01)

(58) Field of Classification Search
CPC . G06T 11/60; G06T 7/13; G06T 2207/20084; G06T 2207/20132; G06F 3/14; G06V 10/761; H04N 21/4223; H04N 21/4312; H04N 21/44008; H04N 21/4788
See application file for complete search history.

(56) References Cited

U.S. PATENT DOCUMENTS

| | | | | |
|---|---|---|---|---|
| 11,336,952 | B2 * | 5/2022 | Stojancic | ........... H04N 21/8456 |
| 2012/0259727 | A1 * | 10/2012 | Fermin | ................. G06F 40/103 |
| | | | | 705/26.5 |
| 2015/0286873 | A1 * | 10/2015 | Davis | .................... G06F 1/1694 |
| | | | | 382/103 |
| 2018/0322706 | A1 * | 11/2018 | Drouin | .................... G06F 3/011 |
| 2019/0364208 | A1 * | 11/2019 | Park | ....................... G06V 20/46 |

* cited by examiner

*Primary Examiner* — Edward Martello
(74) *Attorney, Agent, or Firm* — HAUPTMAN HAM, LLP

(57) ABSTRACT

A method includes processing live image data captured by a camera associated with a first device. The live image data is displayed by the first device. A video displayed by a second device is viewable within the live image data displayed by the first device. The live image data is processed to identify a spatial position of the video displayed with respect to the camera associated with the first device within the live image data, and to identify a known frame of the video. The method also includes causing augmented imagery to be displayed by the first device in a display area of the first device within which the live image data is displayed concurrently with the video displayed by the second device. The augmented imagery is displayed in the display area of the first device based on the identified spatial position, and in response to the known frame.

20 Claims, 10 Drawing Sheets

VIDEO PLAYBACK RECOGNITION PLATFORM 200

FRAME IDENTIFIER MODULE 207

SEQUENCE IDENTIFIER MODULE 209

AUGMENTED IMAGERY MODULE 211

SCREEN FINDER MODULE 201

LOSS CONSTRAINT MODULE 203

CROP/DE-WARP MODULE 205

VIDEO PLAYBACK RECOGNITION APPARATUS AND METHOD

BACKGROUND

Service providers and device manufacturers are continually challenged to deliver value and convenience to consumers by, for example, providing compelling network services. Video playback recognition processes often involve special watermarking, fingerprinting, and/or audio recognition to identify a playback position in a video that is being viewed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a diagram of a loss constraint diagram, in accordance with one or more embodiments.

DETAILED DESCRIPTION

Figure 1:
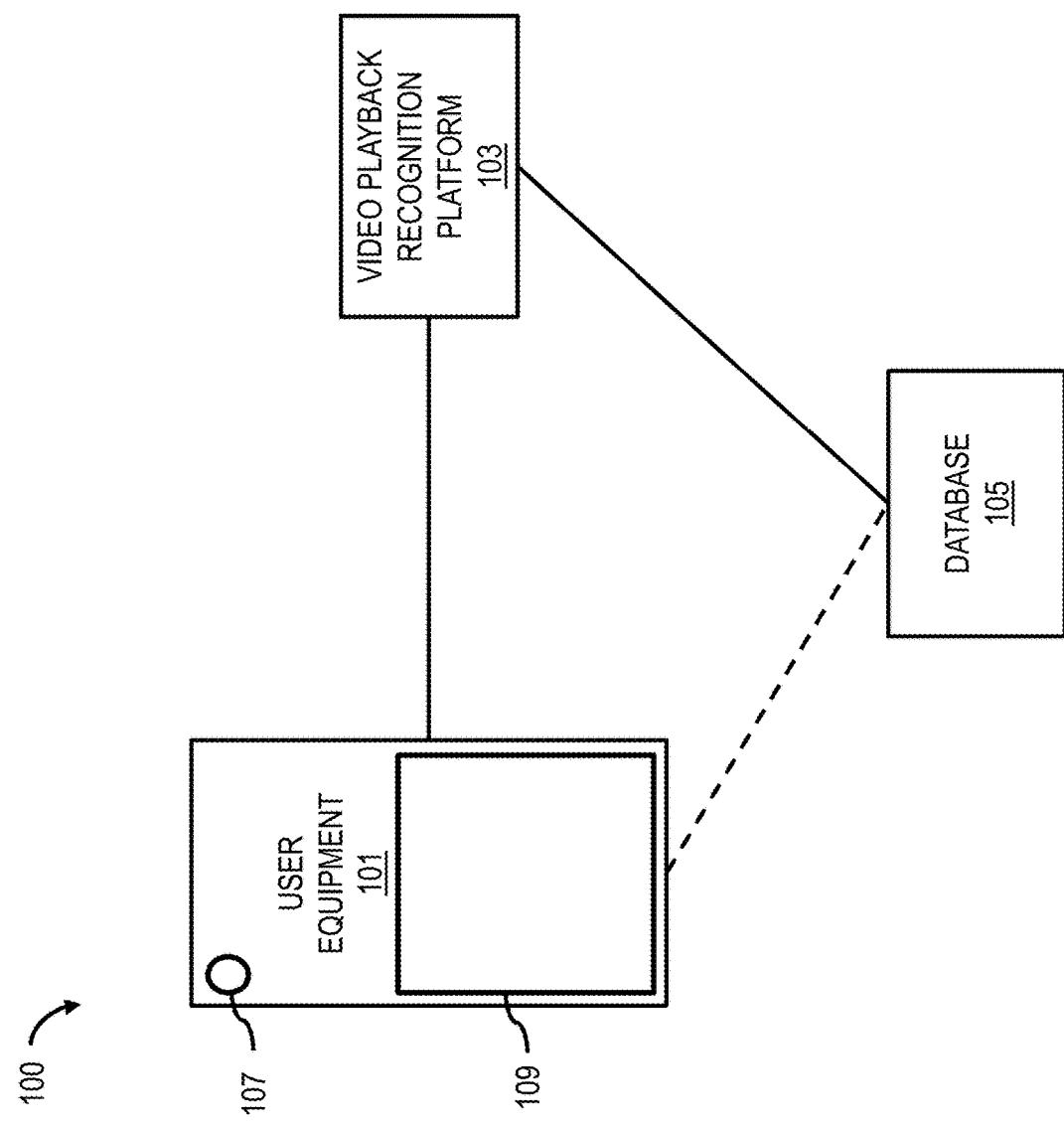
FIG. 1 is a diagram of a system for recognizing a video displayed by a playback device, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, the present disclosure may omit some operations, such as a "response" or "send receipt" that corresponds to the previous operation, for the purpose of simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Game developers, toy manufacturers, media providers, advertisers, etc. are continually challenged to develop new and interesting ways for users to interact with games, toys, television shows, movies, video clips, commercials, advertisements, music, or other consumable media.

FIG. 1 is a diagram of a system 100 for recognizing a video displayed by a playback device, in accordance with one or more embodiments.

System 100 comprises user equipment (UE) 101 having connectivity to a video playback recognition platform 103 and a database 105. The UE 101, video playback recognition platform 103 and a database 105 communicate by wired or wireless communication connection and/or one or more networks, or combination thereof. By way of example, the UE 101, video playback recognition platform 103 and database 105 communicate with each other using well known, new or still developing protocols. In this context, a protocol includes a set of rules defining how the network nodes within a communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

System 100 is configured to recognize a video displayed by a playback device in a manner that provides flexibility to account for background interference. In some embodiments, system 100 provides increased processing speeds and efficiency, and reduces processing burden placed on user devices and network bandwidth.

UE 101 is a type of mobile terminal, fixed terminal, or portable terminal including a desktop computer, laptop computer, notebook computer, netbook computer, tablet computer, wearable circuitry, mobile handset, mobile phone, mobile device, pager, server, gaming console, gaming controller, virtual reality headset, augmented reality glasses, vehicle control unit, navigation device, internet-of-things (IoT) device, some other suitable computing device capable of connecting to a communication network and communicating data by way of a communication network, or a combination thereof.

UE 101 comprises a camera 107 and a display 109. In some embodiments one or more of camera 107 and display 109 are integral components of UE 101. In some embodiments, one or more of camera 107 and display 109 are separate from UE 101 and have connectivity to UE 101.

Video playback recognition platform 103 is a set of computer readable instructions that, when executed by a processor such as a processor 1003 (FIG. 10), processes live image data captured by the camera 107 to identify a playback position in a video displayed by a playback device external to UE 101. In some embodiments, video playback recognition platform 103 is remote from UE 101 and executed by a processor remote from UE 101. In some embodiments, video playback recognition platform 103 is a part of UE 101. In some embodiments, video playback recognition platform 103 is executed by a processor included in UE 101. In some embodiments, one or more processes the video playback recognition platform 103 is configured to perform is divided among UE 101 and a processor remote from UE 101.

Database 105 is a memory such as a memory 1005 (FIG. 10) capable of being queried or caused to store data in accordance with one or more embodiments. In some embodiments, database 105 is caused to store video playback recognition data generated by the video playback recognition platform 103, video playback data recorded by the UE 101, data associated with the UE 101, user data, UE 101 location data, and/or some other suitable information.

According to various embodiments, live image data is captured by the camera 107 and displayed by way of display 109. The video playback recognition platform 103 is configured to process the live image data captured by the camera 107 and displayed by the display 109 to identify a video that is displayed by a playback device. In some embodiments, the playback device is another UE 101, a television, a movie theatre screen, a medium having a projection displayed thereon, a holographic display, or some other suitable device by which a video capable of being displayed is viewable.

In some embodiments, the video playback recognition platform 103 processes the live image data to identify a spatial position of the video displayed with respect to the camera 107 within the live image data captured by the camera 107. For example, based on data extracted from the live image data, video playback recognition platform 103 is configured to identify the relative distance of the displayed video from the camera 107, the viewing angle of the camera 107, the elevation of the camera 107 with respect to the displayed video, and/or some other suitable positioning or orientation information.

In some embodiments, to identify the spatial position of the video displayed with respect to the camera 107 within the live image data captured by the camera 107, video playback recognition platform 103 identifies one or more points in a candidate frame of the video displayed by the playback device, compares the one or more points in the candidate frame to a plurality of points in a database of known points corresponding to known video clips comprising a plurality of known frames. The video playback recognition platform 103 then identifies the known frame within the video displayed by the playback device based on a matching of the one or more points in the candidate frame of the video displayed by the playback device and the plurality of points in the database of known points corresponding to the known video clips comprising the plurality of known frames. In some embodiments, the database of known points is stored in database 105.

The video playback recognition platform 103 processes the live image data to identify one or more known frames of the video displayed by the playback device. In some embodiments, the known frame is made identifiable by training the video playback recognition platform 103 to recognize the frames of the video by feeding live image data captured by the camera 107, or some other suitable camera for training purposes, into the playback recognition platform 103 in advance to cause the playback recognition platform 103 to identify and save information usable for recognizing the frames of the displayed video in database 105.

In some embodiments, video playback recognition platform 103 detects a boundary of the candidate frame in the live image data captured by the camera 107, crops the candidate frame from the live image data captured by the camera 107 to generate a cropped frame image, and processes the cropped frame image to identify the known frame. In some embodiments, the cropped frame image serves as the basis for attempting to identify the one or more known points in the candidate frame. In some embodiments, video playback recognition platform 103 de-warps the cropped frame image before processing the cropped frame image. In some embodiments, video playback recognition platform 103 de-warps a freeze-frame of the live image data, with a focus on reorienting the video displayed by the playback device without cropping the candidate frame from the live image data, such that the video display and the surroundings are reoriented and de-warped for border and/or point recognition without cropping.

According to various embodiments, the video playback recognition platform 103 is configured to be in one or more of a training mode or a video playback recognition mode. In the training mode, the video playback recognition platform 103 processes live image data from the camera 107 or some other suitable camera to facilitate future recognition of the video when the video is played by a playback device when the video playback recognition platform 103 is in the recognition mode. In some embodiments, the video playback recognition platform 103 is in both the training mode and the recognition mode so that the video playback recognition platform 103 continually learns and improves its video playback recognition capabilities. In some embodiments, video playback recognition platform 103 is capable of recognizing video content that is being played by a playback device without any special watermarking or post-production processing of the video. In some embodiments, the video playback recognition platform 103 is configured to process image data fed to the video playback recognition platform 103 for training the video playback recognition platform 103 to recognize one or more frames of the video after viewing/processing the image data of the video that is fed at least one time.

In some embodiments, the video playback recognition platform 103 is capable of being in the training mode when learning to recognize one or more frames of the video. In some embodiments, the video playback recognition platform 103 is continuously in the training mode when in use such that the video playback recognition platform 103 continually learns new and improved ways of recognizing the video, frames of the video, adjusting for environmental issues and/or playback disruption, etc. to provide for increased playback recognition accuracy and efficiency with time.

In some embodiments, the video playback recognition platform 103 processes the live image data to identify one or more frames in the video that is displayed to identify the video as a whole. In some embodiments, the video playback recognition platform 103 processes the live image data to identify one or more frames in the video to identify a playback position of the video which is displayed. In some embodiments, the playback position is a moment in time along a playback timeline from start to finish of the video that is being displayed. In some embodiments, the playback position is based on the known frame to identify where in the video the display of the video is currently at. For example, sometimes a video is edited so that a length of the video, start point, end point, or content of the video differs from another version. Thus, identifying the playback position based on a recognized frame helps to identify where in the video the display of the video is currently at regardless of the format of the video. For example, a theatrical cut of a movie may differ from a director's cut. So, the timeline may change from start to finish. However, to account for this situation, in some embodiments, the video playback recognition platform 103 is configured to identify the playback position in a known video back on a recognized frame in the video.

In some embodiments, video playback recognition platform 103 is configured to cause video playback information to be stored in database 105. In some embodiments, video playback recognition platform 103 is configured to generate statistics regarding viewer interest in a known video based on the playback position(s) detected. For example, based on the spatial position of the camera 107 with respect to a video that is displayed and recognized by video playback recognition platform 103, the video playback recognition platform 103 is configured to identify user interest if the spatial position changes at various moments in the video that is displayed and/or if the video playback recognition platform 103 identifies playback positions that are often skipped, that result in ending viewership, that are most often viewed, or some other suitable data usable for indicating a level of interest in a known video that is being displayed.

In some embodiments, the video playback recognition platform 103 applies one or more neural network models in the training mode and/or the recognition mode to facilitate learning to recognize a displayed video as a known video and/or recognizing one or more frames of a known video that is displayed to generate data indicating the known video is recognized, indicating one or more frames of the known video are identified, and/or indicating the playback position of the known video. In some embodiments, the one or more neural network models comprise a screen finder model, a frame identifier model, a sequence identifier model, or some other suitable model usable for processing video-related data, camera feed imagery, or other suitable data to learn to find and/or recognize a video that is displayed and captured by a camera and a playback position of the video based on one or more frames of the video, etc.

In some embodiments, the video playback recognition platform 103 causes augmented imagery to be displayed by display 109 in a display area within which the live image data is displayed. In some embodiments, the augmented imagery is displayed concurrently with the video displayed by the playback device in the display area. In some embodiments, the augmented imagery is displayed in the display area based on the identified spatial position of the video displayed with respect to the camera 107 within the live image data captured by the camera 107. In some embodiments, the augmented imagery is displayed in response to the known frame. In some embodiments, the augmented imagery is displayed by UE 101 so as to appear between the video displayed by the playback device and UE 101. In some embodiments, the augmented imagery is displayed by UE 101 so as to appear as being on the video displayed by the playback device.

In some embodiments, video playback recognition platform 103 is configured to cause the augmented imagery to be displayed in response to the playback position in the video displayed by the playback device, where the video playback recognition platform 103 identifies the playback position based on the known frame.

In some embodiments, the playback position is an estimated playback position in the video displayed by the playback device. In some embodiments, the estimated playback position is based on a continuously transformed state of the video displayed by the playback device. In some embodiments, the continuously transformed state corresponds to a time in the playback of the video displayed by the playback device. In some embodiments, the continuously transformed state is based on a plurality of past states in a table of past states ranging from an oldest past state to a newest past state. In some embodiments, the table of past states is stored in database 105. In some embodiments, the estimated playback position is a projected playback position and/or estimate/projected current frame at the time the augmented imagery is caused to be displayed. For example, if the video playback recognition platform 103 recognizes a frame in a known video and causes the augmented imagery to be displayed, the moment the augmented imagery is displayed may be later in the displayed video subsequent to the moment of detection.

In some embodiments, the video playback recognition platform 103 processes the video displayed by the playback device by applying the one or more of the neural network models, such as the sequence identifier model, to generate the continuously transformed state and the estimated playback position. In some embodiments, the table of past states is maintained outside the one or more neural network models that is applied to generate the continuously transformed state and the estimated playback position.

In some embodiments, video playback recognition platform 103 causes one or more of the plurality of past states in the table of past states to be supplied to the one or more neural network models applied to generate the continuously transformed state and the estimated playback position for determining a latest state based on the known frame, causes the one or more applied neural network models to generate the estimated playback position, and causes the latest state to be added to the table of past states as the newest past state.

In some embodiments, the video playback recognition platform 103 causes a message to be communicated to the UE 101 based on the identified playback position in the video displayed by the playback device. In some embodiments, the content of the message is based on the playback position of the video displayed by the playback device at the playback position which is detected based on the known frame and/or based on the estimated/projected playback position at the time the message is communicated to UE 101 and/or displayed by UE 101. In some embodiments, the message communicated to the UE 101 comprises a prompt to interact with the UE 101, an advertisement, a clickable link, or some other suitable message. In some embodiments, the message is an incentive to interact with the UE 101, a coupon, or some other e-commerce a reward. In some embodiments, the reward or incentive is in the context of a video game. In some embodiments, the reward or incentive is a real-world value associated with money, a promotional product or other suitable commercial benefit. In some embodiments, video playback recognition platform 103 is configured to cause a reward to be delivered in real time without the video being displayed by the playback device being finished.

In some embodiments, the prompt or message comprises one or more of sounds, vibrating, or initiating a change in the context of a video game based on a recognized event in a television show, movie, commercial, music video, video game, or other suitable video media wherein the recognized event is determined based on identifying the known frame.

In some embodiments, the augmented imagery comprises the prompt or message communicated to the UE 101. In some embodiments, the augmented imagery is a displayable entity or graphical user interface object with which a user of UE 101 is able to interact. In some embodiments, the augmented imagery is viewable for entertainment purposes based on the identified known frame, identified playback position and/or estimated/projected playback position. In some embodiments, the augmented imagery is a product that is viewable in the live image data displayed by display 109. In some embodiments, the augmented imagery is superimposed on one or more objects viewable in the live image data displayed by display 109. In some embodiments, the content, graphics, type, etc. of the augmented imagery is based on the identified known frame, identified playback position and/or estimated/projected playback position. For example, in some embodiments, the augmented imagery comprises a message, a clickable link, an advertisement, a coupon, a prompt, a gaming interface, an artificial intelligence language model, clothing, make-up, home goods, paint colors, tattoos, jewelry, glasses, avatar imagery, some other graphic such as those discussed herein, and/or some other suitable graphic that is caused to appear in the display 109 in response to an instruction to trigger such displaying such imagery based on the identified known video, known frame, identified, playback position, and/or estimated/projected playback position.

Figure 2:
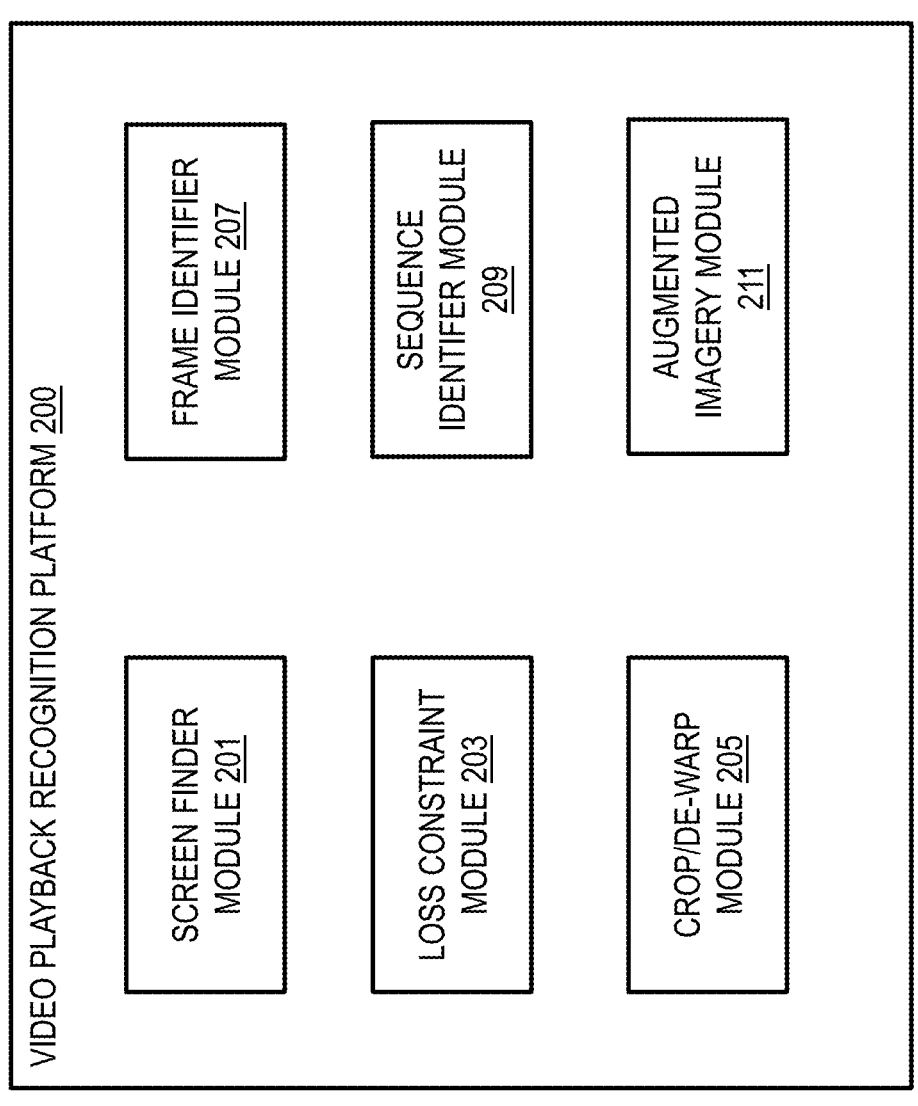
FIG. 2 is a diagram of video playback recognition platform, in accordance with one or more embodiments.

FIG. 2 is a diagram of video playback recognition platform 200, in accordance with one or more embodiments. Video playback recognition platform 200 is an example configuration of video playback recognition platform 103 (FIG. 1).

Video playback recognition platform 200 comprises a screen finder module 201, a loss constraint module 203, a crop/de-warp module 205, a frame identifier module 207, a sequence identifier module 209, and an augmented imagery module 211. In some embodiments, the various modules of video playback recognition platform 200 communicated directly or indirectly with one another to provide inputs and outputs for corresponding neural network models, processes and/or functions that are performed by the video playback recognition platform 200 and/or video playback recognition platform 103.

Figure 3:
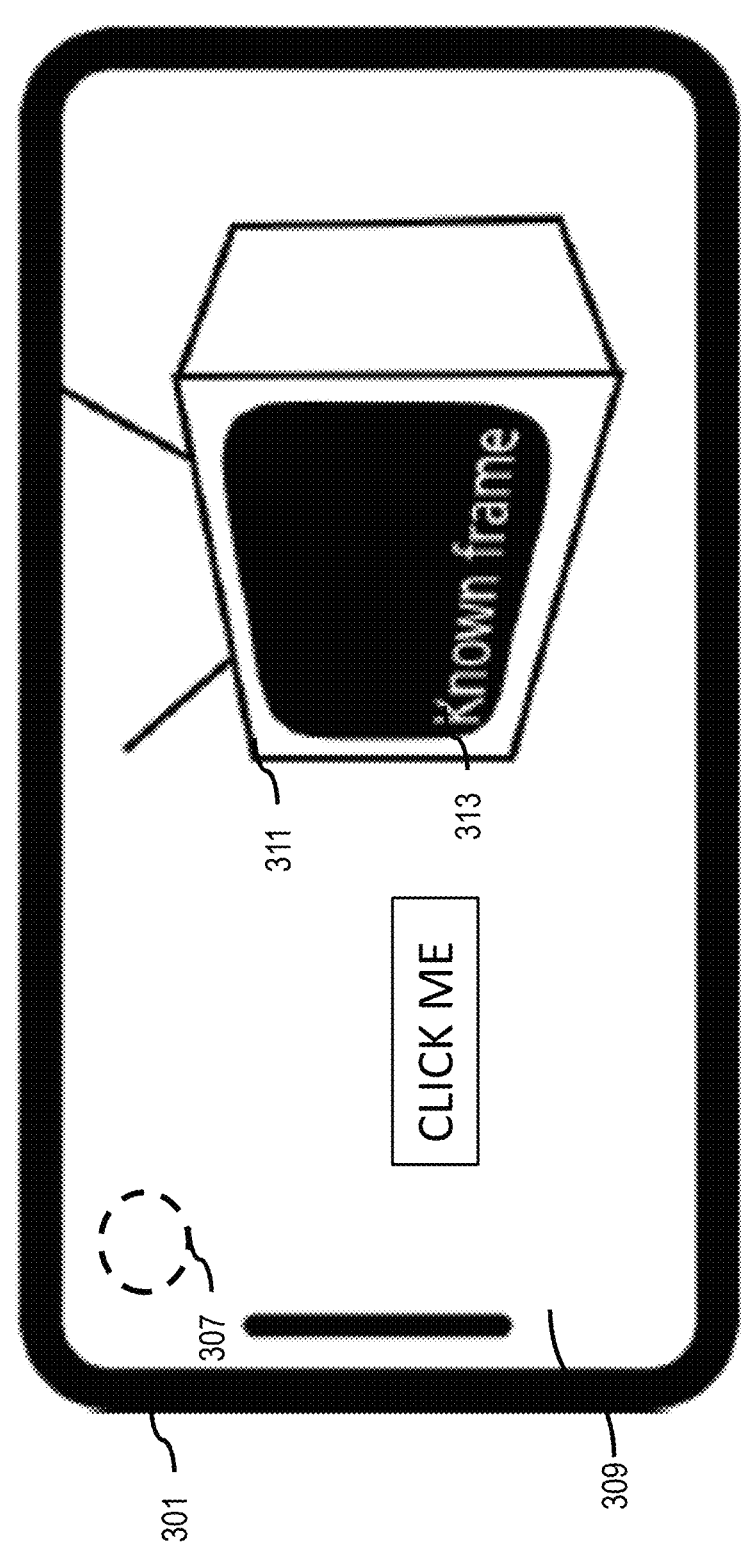
FIG. 3 is a diagram of user equipment with live image data being displayed, in accordance with one or more embodiments.

FIG. 3 is a diagram of a UE 301 with live image data being displayed, in accordance with one or more embodiments. UE 301 is similar to UE 101 (FIG. 1), with the reference numerals increased by 200. UE 301 comprises a camera 307 and a display 309. The display 309 shows live image data captured by camera 307. A playback device 311 is within the live image data that is viewable by way of display 309. The playback device 311 in this example is displaying a video having a known frame 313.

In this example, UE 301 is pointed at playback device 311 which is a television screen where a known video is playing. Video playback recognition platform 103 (FIG. 1) processes the live image data captured by camera 307 and displayed by way of display 309 to determine the position of the displayed video in space relative to the UE 301. In some embodiments, the position in space is relative to the camera 307. In some embodiments, the position in space is initially relative to the camera 307 and video playback recognition platform 103 calculates the position of the video in space relative to the UE 301 and/or display 309 based on the position in space relative to the camera 307 and an adjustment factor based on a positional relationship between the camera 307 and one or more of display 309, an overall position of the camera 307 with respect to an entirety of UE 301, or some other suitable basis.

In some embodiments, video playback recognition platform 103 finds a homography identifying where four corners of the displayed video are located in the live image data. In some embodiments, the homography identifies one or more edges of the displayed video or some other suitable border associated with the displayed video. In some embodiments, the homography is identified without a depth component and enables in-plane augmentation. Such in-plane augmentation is possible, for example, without any knowledge of the camera 307's intrinsics such as field of view, view angle, a zoom-in amount, or a zoom-out amount. In some embodiments, homography without depth enables augmentation such as a box around the video, subtitles as if on the television screen, or some other suitable messaging or augmented imagery.

In some embodiments, the video playback recognition platform 103 estimates spatial information from the intrinsics associated with the camera 307 to facilitate augmented imagery that is caused to be displayed in front of the playback device 311 (e.g., appearing between the UE 301 and the playback device 311) and/or behind the playback device 311 in the display 309. In some embodiments, the augmented imagery is displayed one or more of between the UE 301 and the playback device 311, on the video displayed by the playback device 311, and/or behind the playback device 311 concurrently with the live image data that is displayed by display 309.

The video playback recognition platform 103 processes image data, including the video being played back by the playback device 311, in an attempt to identify a known frame in the video. Based on a detection of a known frame, the video playback recognition platform 103 identifies the playback position of the video at the moment of capture (e.g., how far into the video the playback is the from start to finish, a moment corresponding to the known frame, etc.), and/or an estimated/projected playback position based on the identified playback position, which in turn enables one or more of enables a timing, content, and/or type of the augmented imagery to be displayed within the image data being displayed by way of display 309.

In some embodiments, the augmented imagery that is concurrently displayed with the live image data is a user interface object with which a user of UE 301 is capable of interacting. In some embodiments, the spatial relationship between the UE 301 and the playback device 311 and/or a detected interaction with the augmented imagery is a data collection point providing user telemetry.

Figure 4:
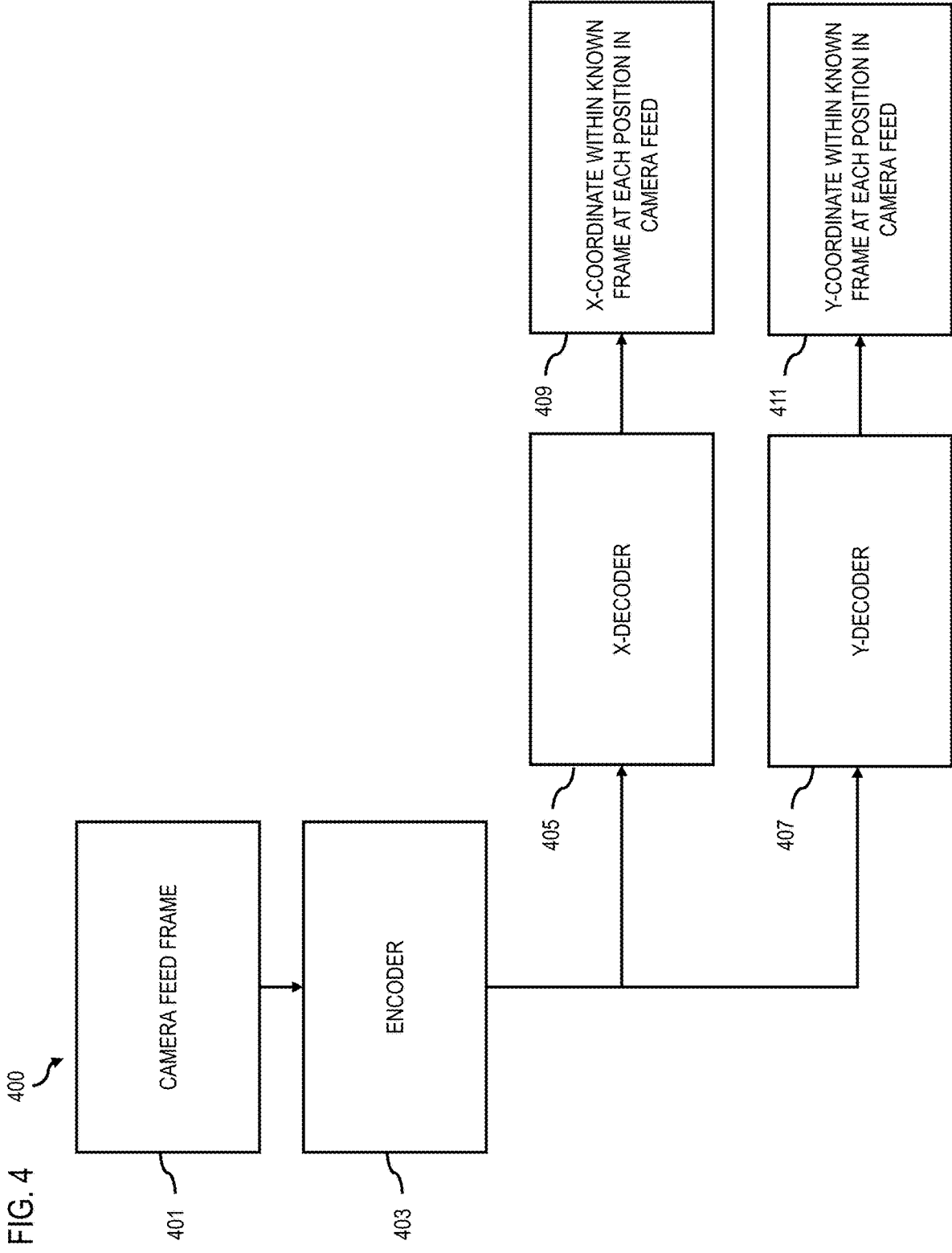
FIG. 4 is a diagram of a screen finder process, in accordance with one or more embodiments.

FIG. 4 is a diagram of a screen finder process 400, in accordance with one or more embodiments. In some embodiments, video playback recognition platform 103 (FIG. 1) performs the screen finder process 400. In some embodiments, screen finder process 400 is performed by a screen finder model of video playback recognition platform 103.

Screen finder process 400 is executed to find a display screen/display area of a video displayed by a playback device that is captured by a camera, such as camera 107 (FIG. 1) associated with UE 101 (FIG. 1) or some other suitable camera.

In step 401, live image data is captured by a camera.

In step 403, the live image data is communicated to an encoder. In some embodiments, the live image data communicated to encoder is a video feed. In some embodiments, the live image data is communicated to encoder frame-by-frame, for example, such that encoder receives one frame of video feed from the camera. In some embodiments, the frame of video feed received by the encoder is a 128×128 RGB image, or some other suitable resolution and/or color format. In some embodiments, the frame communicated to the encoder is a full frame. In some embodiments, the frame communicated to the encoder is a cropped frame. In some embodiments, the frame communicated to the encoder is a de-warped frame. In some embodiments, the frame communicated to the encoder is a cropped and de-warped frame. In some embodiments, a previously known position of the video displayed by the playback device with respect to camera and/or the UE is applied when processing the frame communicated to the encoder to speed up an estimate of the spatial position of the video displayed by the playback device with respect to camera and/or the UE.

In step 403, the encoder downsamples and encodes the live image data received from the camera and communicates an output to an x-decoder and a y-decoder.

In step 405, the x-decoder receives the output from the encoder.

In step 407, the y-decoder receives the output from the encoder.

The encoder, the x-decoder, and the y-decoder are components of a downsampling/encoding chain (e.g., 2D convolutions, 2×2 max pool, PReLU and batch normalization), that is then split into two upsampling/decoding chains (e.g., bilinear upsampling instead of a max pool) to produce two channels of an output map (e.g, x-coordinate and y-coordinate, respectively).

In step 409, the x-decoder produces an x-coordinate channel of the output map.

In step 411, the y-decoder produces the y-coordinate channel of the output map.

In some embodiments, both channels of the output map are quantized into 15 locations within the known video frame and one value to indicate outside. In some embodiments, the outputs are only 32×32, wherein one estimate is generated per 4×4 pixels of input.

The output map generated by the screen finder process 400 indicates where the known video frame (if found) is positioned relative to the input (the live image data fed from the camera to the encoder). For each location in the live image data fed from the camera to the encoder, the spatial coordinates in the known frame of the video, or a value to indicate that the given location does not map on to a known video frame, are/is output.

In some embodiments, when the video playback recognition platform 103 is in the training mode and learning to recognize a video, the output map improves learnability of a frame of the video compared to recognizing just four corners of the frame, for example. The output map makes it possible for the video playback recognition platform 103 to latch on to details elsewhere in the video frame, which also makes it possible for future applications of the video playback recognition platform 103 to recognize the frame as a known frame (e.g. if the known video has pilar box regions having edges that are not easy to find).

In some embodiments, the output is quantized and "one hot," meaning that the video playback recognition platform 103 is capable of learning to hedge its bets when estimating what location in a known video (if any) appears at each location in the input.

In some embodiments, when training the screen finder model, plausible inputs are synthesized using frames from the known video augmented in one or more ways. In some embodiments, two adjacent frames are regularly blended together in random proportions. In some embodiments, colors are randomly distorted using a linear transformation in RGB space, or in some other suitable manner. In some embodiments, color distortion helps to adjust for a potentially heavy bias toward white-out, because displays are often much brighter than surroundings. In some embodiments, inputs that are modified by color distortion or other manner are placed on top of a training background comprising an arbitrary unlabeled set of images. In some embodiments, the images included in the training background are also subjected to random color distortion. In some embodiments, the images included in the training background are biased toward black to assist in recognition of the known frame(s) in different types of environments surrounding the displayed video.

In some embodiments, the positioning of the frame over the background is based on a randomized homography, so the display of the video could be anywhere in the frame of the live image data and could be angled arbitrarily if the camera is not directed at the display of the video head-on.

In some embodiments, the training background is augmented to simulate reflections on a display of the video, for example, to simulate situations in which an attempt to recognize a video playback position is made wherein a television or other display having a reflective display surface is the playback device by which the video is being displayed.

In some embodiments, motion blur is simulated when training the screen finder model by overlaying the frames of the video over copies of the same frames (e.g., a frame laid over itself) many times with the homography gradually changing in a random direction. In some embodiments, a random blanket blur is added to everything to simulate bad focus. In some embodiments, Perlin noise is added to simulate arbitrary lighting and shadow effects. In some embodiments, an undistort function is applied to simulate ways in which the camera could deviate from a perfect pinhole model (e.g. to avoid situations in which a camera might have a tendency toward generating a fisheye image). In some embodiments, deviation from the perfect pinhole model are effects that are not modeled when training the screen finder model, but rather approximated and accounted for when detected when they do happen when a video is the subject that is to be recognized. In some embodiments, JPEG artifacts are applied to the result.

Figure 5:
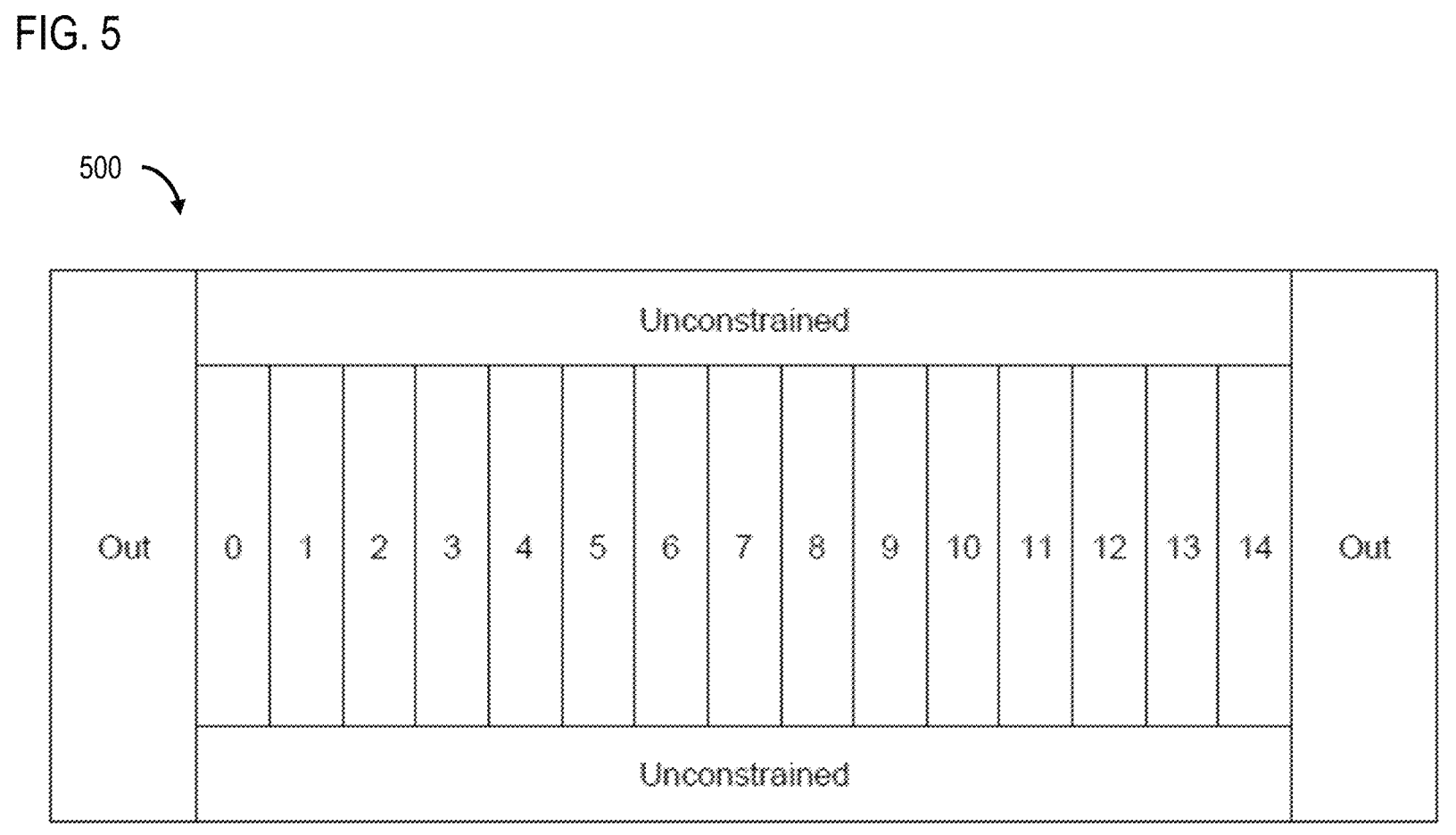

FIG. 5 is a diagram of a loss constraint diagram 500, in accordance with one or more embodiments.

In some embodiments, when training to recognize a video and/or attempting recognizing a video by identifying a known frame, some categorical cross-entropy loss per pixel per output channel occurs. For example, for the x-output, regions above and below the known video area (i.e. where x is in bounds but y is not) do not contribute to the loss (i.e. the regions above and below the known region are unconstrained), as there is unlikely to be useful visual information to identify the correct x-value, and the y-value indicates the data is out of bounds for processing. Loss constraint diagram 500 illustrates this for the x-output. Similarly, according to loss constraint diagram 500, the y-output does not contribute to the loss for regions to the left and right, where y is in bounds but x is not.

Figure 6:
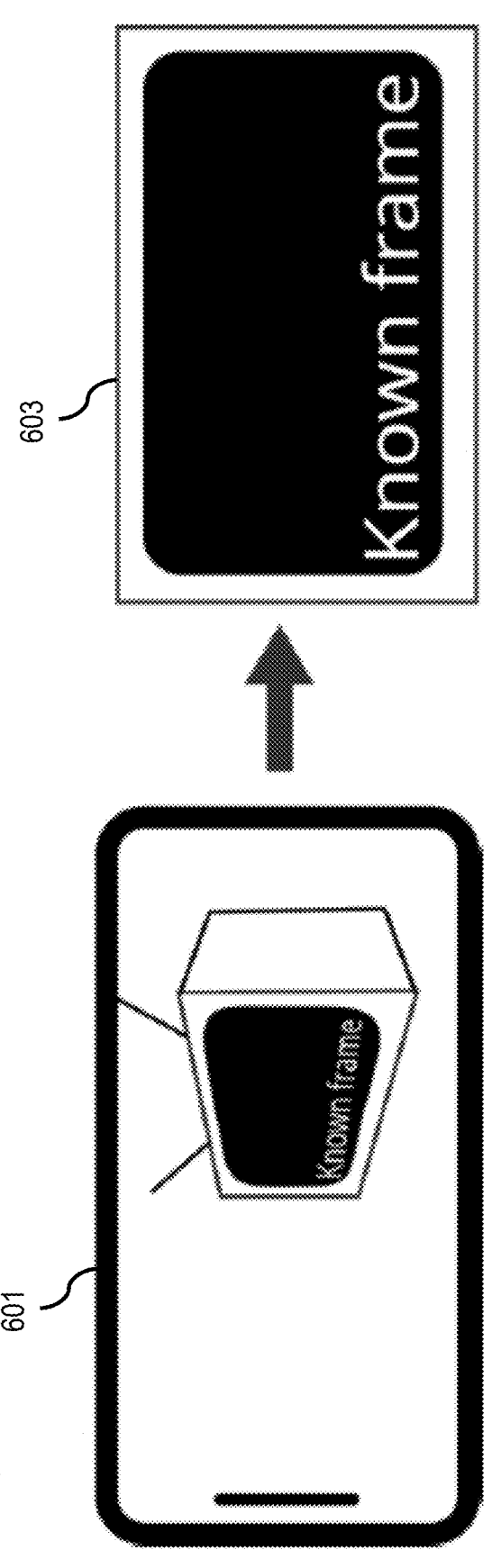
FIG. 6 is a graphical representation a cropping and de-warping process, in accordance with one or more embodiments.

FIG. 6 is a graphical representation a cropping and de-warping process 600, in accordance with one or more embodiments. In some embodiments, video playback recognition platform 103 (FIG. 1) performs the cropping and de-warping process 600. In some embodiments, cropping and de-warping process 600 is performed by a crop/de-warp module of video playback recognition platform 103. In some embodiments, video playback recognition platform 103 processes the output of the screen finder model to generate a cropped and de-warped image of a candidate frame that, when compared to known frames, is identified as a known frame.

In use, video playback recognition platform 103 identifies all the cells for which an in-bounds prediction was made for both x and y coordinates (i.e., the cells where the known video frame was found). In some embodiments, the video playback recognition platform 103 then calculates a goodness value for the cells which are found in the known video frame. In some embodiments, the goodness value is a degree to which the video playback recognition platform 103 was able to identify a clear location in the known video frame without estimation. The video playback recognition platform 103 then later applies the goodness values as weights for random sampling of the identified cells. In some embodiments, a preset quantity of non-zero goodness values are set as a minimum quantity random sampling. For example, in some embodiments, at least 16 nonzero goodness values, or some other suitable quantity of goodness values, are calculated before proceeding to a random sampling process.

In some embodiments, video playback recognition platform 103 then runs a random sampling consensus (RANSAC) algorithm for fitting a homography to data that includes outliers, which includes the predictions for what part of the known frame appears at each point in the input live image data captured by a camera such as camera 107 (FIG. 1) that is fed into video playback recognition platform 103. In some embodiments, the RANSAC algorithm is executed up to a preset quantity of times (e.g., 100 attempts or some other suitable quantity) to find a good estimate for the homography (e.g., identifying where four corners of the displayed video are). For each attempt, video playback recognition platform 103 chooses four different cells that have good 'goodness' values, thereby using the goodness values as weights for random sampling to find the locations of the chosen cells. The locations of the chosen cells in the camera feed, plus the estimated location for those cells in the known video frame, are then used by video playback recognition platform 103 to compute a homography (e.g., OpenCV 'findHomography'), which is an estimate for where the known frame might be. For each homography found this way, video playback recognition platform 103 measures how many of all the cells (not just the four) agree on where the known frame is (e.g., these cells are 'inliers').

Then, video playback recognition platform 103 takes the homography with the best goodness score, and refines the homography with a final 'findHomography' process on all inliers.

Once the video playback recognition platform 103 is done with the final homography estimating the found video's spatial position within the live image data, the video playback recognition platform 103 crops the candidate frame out of the live image data in step 601 and removes perspective warp (OpenCV 'warpPerspective') in step 603 to generate a cropped and de-warped frame.

The cropped and de-warped frame is at least an approximately full-frame image of the found video which is then fed into the frame identifier model of video playback recognition platform 103.

Figure 7:
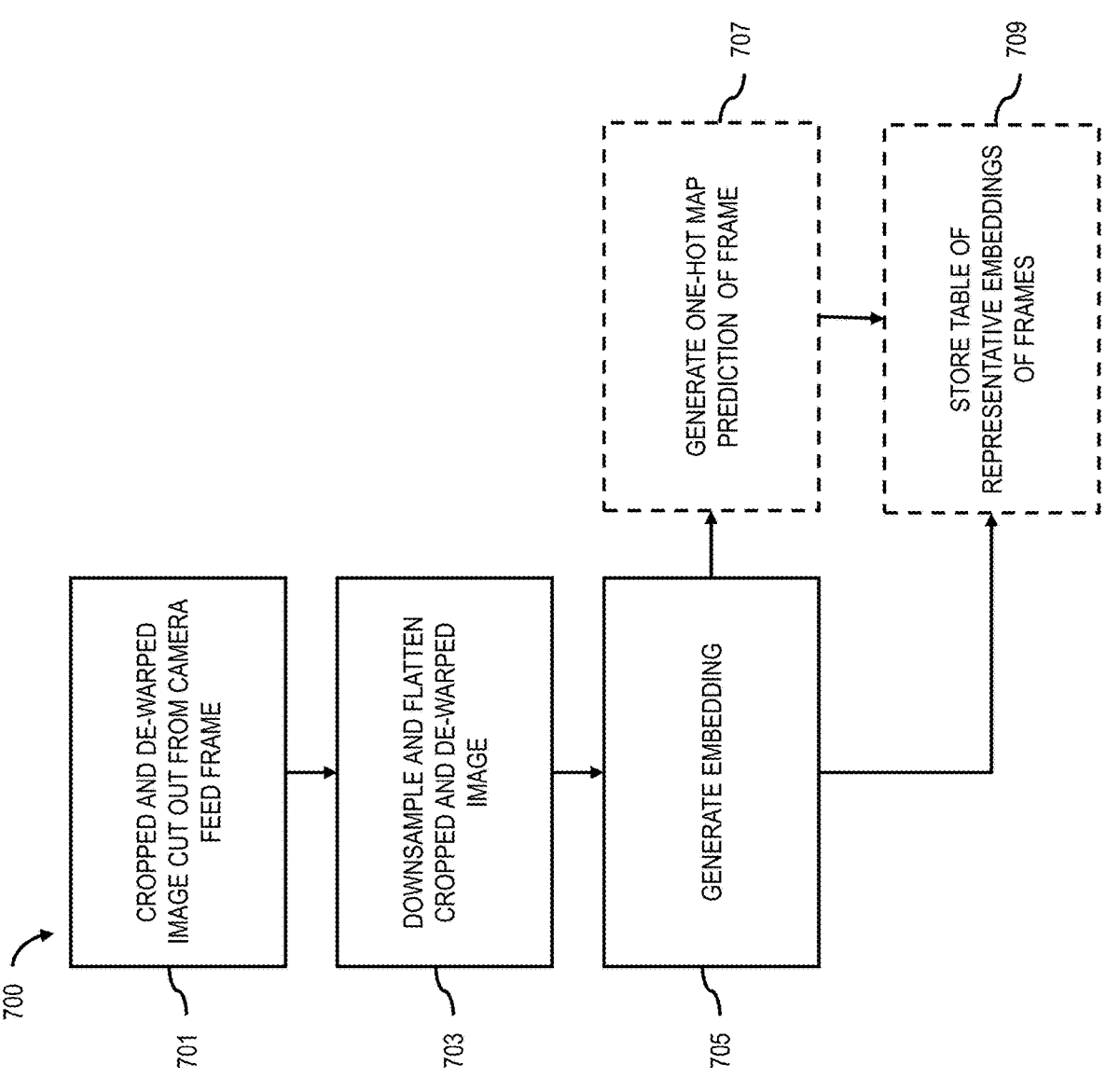
FIG. 7 is a diagram of a frame identifier process, in accordance with one or more embodiments.

FIG. 7 is a diagram of a frame identifier process 700, in accordance with one or more embodiments. In some embodiments, video playback recognition platform 103 (FIG. 1) performs the frame identifier process 700. In some embodiments, frame identifier process 700 is performed by a frame identifier model of video playback recognition platform 103.

In step 701, a first attempt is made at identifying where the video that is being played is along a playback timeline from start to finish, and/or based on an identified known frame, without any knowledge from any previous frames. A cropped and de-warped image of the known video frame is cut out of the camera feed frame, as located by the screen finder model.

In step 703, the cropped and de-warped image is down-sampled by an encoder, flattened, and then subjected to a fully connected transformation to an embedding size of 32, or some other suitable number.

In step 705, an embedding (e.g., a list of numbers whose exact meanings are arbitrary and completely learnt) is generated that attempts to capture as much identifying information about the playback position as possible. Capturing identification information, alone, is part of the learning process for identifying the known frame in the future, wherein based on prior learning of video frames, the position within a video segment is capable of being determined when a known frame is detected. In the training mode, when a still image is shown, a frame is detected and processed, and/or two sections of a video clip are repeated, the video playback recognition platform 103 learns to put whatever information is available into the embedding in some way.

In some embodiments, when training the video playback recognition platform 103, the camera is positioned straight on with the video being displayed for the screen finder module to detect, for example, and/or close to 1:1 with a small amount of randomization remaining to account for potential inaccuracies in the screen finder process.

In some embodiments, optional step 707 is performed for training purposes. In step 707, a fully connected layer expands the embedding out to generate a one-hot map of the frame of the video that is to be the known video. Here, for example, an assumption is made that a frame is detected since the frame was identified by the screen finder process and, if the process gets this far, there is no special value indicating no frame. The screen finder model is then trained with categorical cross-entropy.

In some embodiments, as part of the training, the video playback recognition platform 103 learns and saves a representative embedding value for each known video frame in optional step 709. In some embodiments, the table of representative embeddings is stored in database 105 (FIG. 1). In some embodiments, a mean squared loss is defined between the embeddings in the table and the outputs the video playback recognition platform 103 is learning to produce to ensure the embeddings in the table match the outputs the video playback recognition platform 103 is learning to produce.

Figure 8:
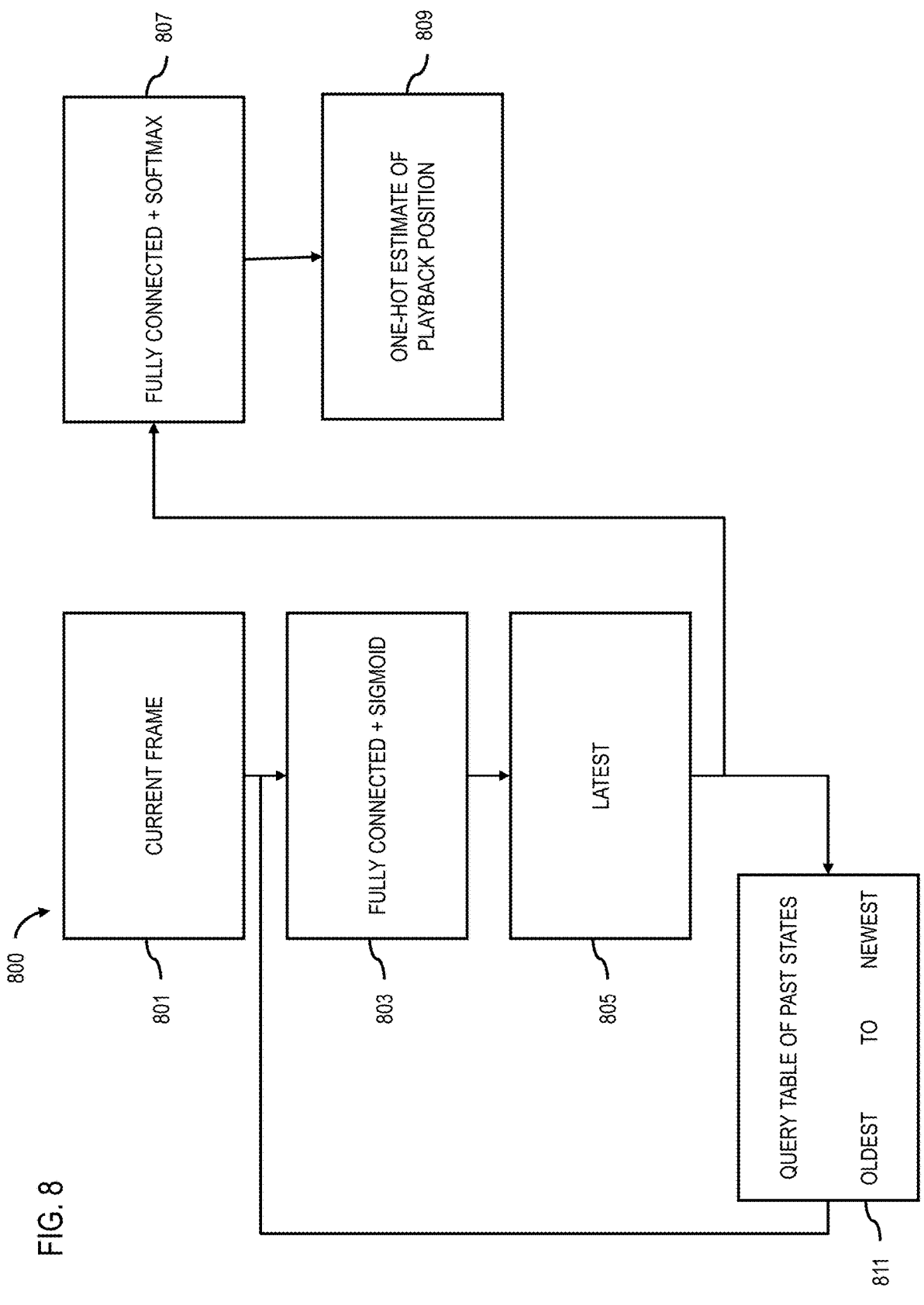
FIG. 8 is a flow diagram of a sequence identifier process for generating an estimated playback position, in accordance with one or more embodiments.

FIG. 8 is a flow diagram of a sequence identifier process 800 for generating an estimated playback position, in accordance with one or more embodiments. In some embodiments, video playback recognition platform 103 (FIG. 1) performs sequency identifier process 800. In some embodiments, sequence identifier process 800 is performed by a sequence identifier model of video playback recognition platform 103.

Sequence identifier process 800 introduces a memory element into the playback position estimate. Conventional techniques for adding long-term memory to neural network models usually involve long short-term memory (LSTM) networks. Such conventional techniques, however, often fail because those architectures cannot track the passage of time.

For example, either a memory is held relatively static for a long time or it is forgotten quickly. As a result, conventional techniques often have issues with still frame images within a video and/or playback pauses/hang-ups.

According to various embodiments, for still photos appearing in the known video, the video playback recognition platform 103 is configured to know exactly how much time has passed while seeing a still photo—even if a long period of time has passed. Instead of preserving a state (with gating to forget selectively, for example) from frame to frame, video playback recognition platform 103 transforms the state the whole time the frame is being viewed, but with memory of previous states from both the immediate and more distant past.

In step 801, the embedding produced by the frame identifier model for the current frame is fed into the sequence identifier model for processing to generate output states at fixed points in the past. In some embodiments, the fixed points in the past are 1, 2, 4, 8, 16, 32, etc. frames ago. In some embodiments, frame history is processed at fixed points in the past in powers of 2.

In this example, state is 32 arbitrary numbers that the video playback recognition platform 103 can learn to use to know where in the playback timeline and/or a playback frame position is in a known video at any given time.

In step 803, one fully connected layer+sigmoid activation is performed, taking all inputs to produce a new state in step 805. Then, in step 807, a further fully connected layer+softmax is performed to produce a one-hot estimate in step 809.

In some embodiments, video playback recognition platform 103 generates the one-hot estimate of which frame playback is up to in the full known video, with a special slot to indicate no current valid playback.

In step 811, the video playback recognition platform 103 queries a table of previous states outside the neural network of the video playback recognition platform 103 so that correct past states are able to be fed back into the model at the right time when looping steps 803, 804 and 811 for performing steps 803 and 805 when applying the past states to in steps 803 and 805.

In the training mode, the sequence identifier model is unrolled, which means copies of the model are chained together so that the video playback recognition platform 103 processes the outputs generated by the video playback recognition platform 103 as inputs. The video playback recognition platform 103 is then fed a sequence of embeddings that the frame identifier model could plausibly have produced over time for some stretch of the known video. For this, representative embeddings learned while training the screen finder model are used. In some embodiments, the chosen sequence starts before the known video starts, or ends after the known video ends. In this case, embeddings are inserted from random frames in the out-of-bounds period.

In some embodiments, training is performed in ways that cause the video playback recognition platform 103 to learn how to process and recognize the video being played in less than ideal viewing conditions. For example, in some embodiments, when training the video playback recognition platform 103, frames are randomly held to simulate choppy playback or choppy processing. In some embodiments, random noise is applied to all frame embeddings. In some embodiments, random noise is applied to frame embeddings separately before and after duplicating the embeddings for frame holding, and a random bias is applied to the sequence as a whole. In some embodiments, one or more parts of the sequence are randomly dropped or omitted and replaced with embeddings from random frames to simulate gaps in the video playback and/or screen not being visible. In some embodiments, training is performed on a completely invalid sequence, in which case the video playback recognition platform is asked to report the special invalid value in the output instead of a valid sequence of playback positions.

In some embodiments, the unrolled model is executed with some past states that are synthesized for a period before the video playback recognition platform begins producing states as outputs. To facilitate the production of states based on the processing of the past states, random numbers are fed into the video playback recognition platform 103 so the video playback recognition platform 103 leans to recover from anything.

Figure 9:
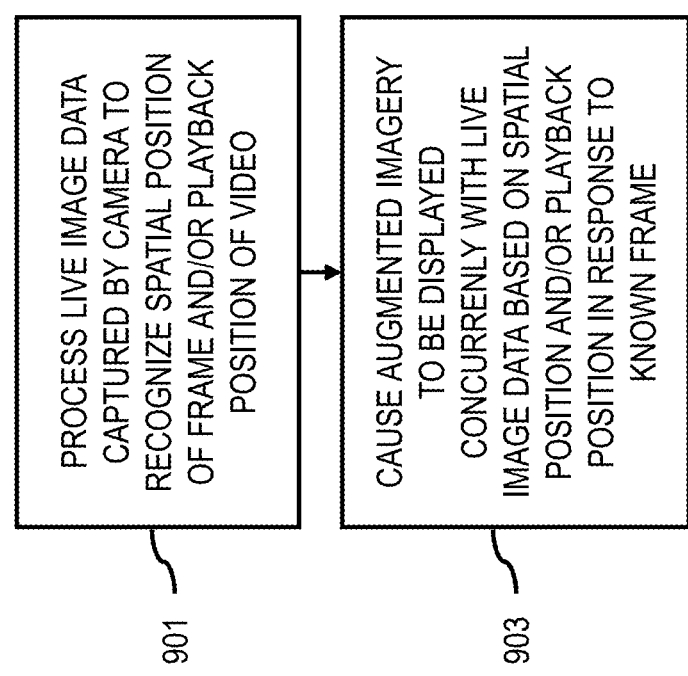
FIG. 9 is a flow chart of a process of determining a video playback position and causing augmented imagery to be displayed, in accordance with one or more embodiments.

FIG. 9 is a flow chart of a process 900 of determining a video playback position and causing augmented imagery to be displayed, in accordance with one or more embodiments. In some embodiments, video playback recognition platform 103 (FIG. 1) performs the process 900.

In step 901, live image data captured by a camera associated with a first device is processed. The live image data is, for example, displayed by the first device, a video displayed by a second device is viewable within the live image data displayed by the first device, the live image data is processed to identify a spatial position of the video displayed with respect to the camera associated with the first device within the live image data captured by the camera, and the live image data is processed to identify a known frame of the video displayed by the second device.

In some embodiments, the processing of the live image data to identify the spatial position of the video displayed with respect to the camera associated with the first device within the live image data captured by the camera, comprises identifying one or more points in a candidate frame of the video displayed by the second device, comparing the one or more points in the candidate frame to a plurality of points in a database of known points corresponding to known video clips comprising a plurality of known frames, and identifying the known frame within the video displayed by the second device based on a matching of the one or more points in the candidate frame of the video displayed by the second device and the plurality of points in the database of known points corresponding to the known video clips comprising the plurality of known frames.

In some embodiments, a boundary of the candidate frame in the live image data captured by the camera is detected, the candidate frame is cropped from the live image data captured by the camera to generate a cropped frame image, and the cropped frame image is processed to identify the known frame. In some embodiments, the cropped frame image is de-warped before processing the cropped frame image.

In step 903, augmented imagery is caused to be displayed by the first device in a display area of the first device within which the live image data is displayed concurrently with the video displayed by the second device. The augmented imagery is displayed, for example, in the display area of the first device based on the identified spatial position of the video displayed with respect to the camera associated with the first device within the live image data captured by the camera, and in response to the known frame.

In some embodiments, the augmented imagery is displayed by the first device so as to appear between the video displayed by the second device and the first device. In some embodiments, the augmented imagery is displayed by the first device so as to appear behind the video displayed by the second device such that the video displayed by the second device is between the augmented imagery and the first device. In some embodiments, the augmented imagery is displayed by the first device so as to appear as being on the video displayed by the second device. In some embodiments, the augmented imagery is displayed by the first device so as to appear anywhere in the display area of the first device, in multiple position and/or so as to move in front of, on, and/or behind the video displayed by the second device.

In some embodiments, the augmented imagery is caused to be displayed in response to a playback position in the video displayed by the second device, wherein the playback position is based on the known frame.

In some embodiments, the playback position is an estimated playback position in the video displayed by the second device, the estimated playback position is based on a continuously transformed state of the video displayed by the second device, the continuously transformed state corresponds to a time or a particular frame in the playback of the video displayed by the second device, and the continuously transformed state is based on a plurality of past states in a table of past states ranging from an oldest past state to a newest past state.

In some embodiments, the table of past states is maintained outside a neural network that generates the continuously transformed state and the estimated playback position, and one or more of the plurality of past states in the table of past states are caused to be supplied to the neural network for determining a latest state based on the known frame; the neural network is caused to generate the estimated playback position, and the latest state is caused to be added to the table of past states as the newest past state.

Figure 10:
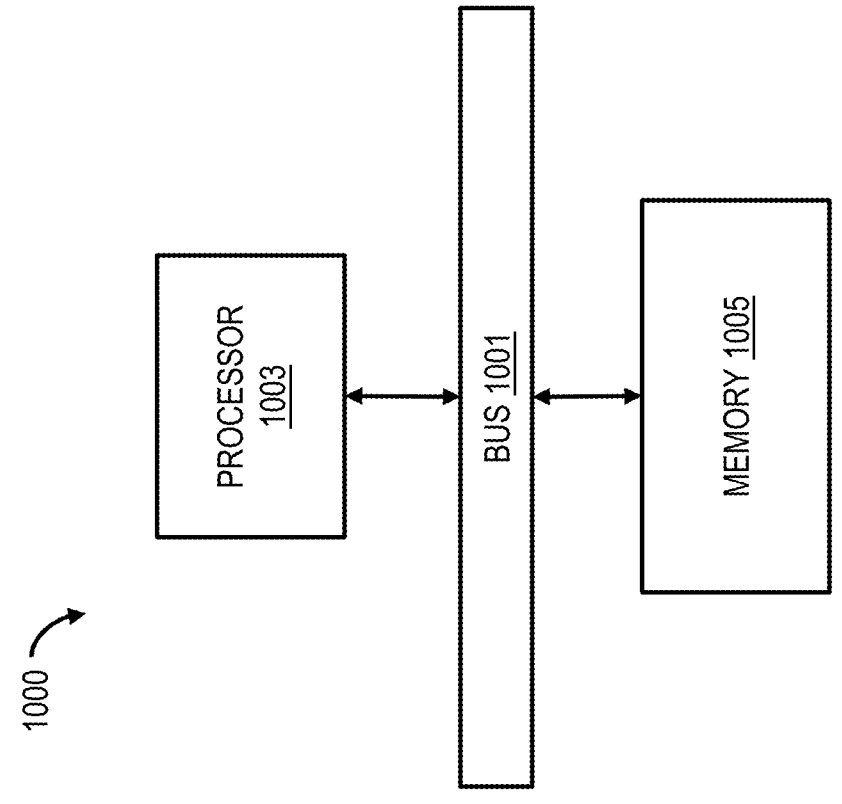
FIG. 10 is a functional block diagram of a computer or processor-based system upon which or by which an embodiment is implemented.

FIG. 10 is a functional block diagram of a computer or processor-based system 1000 upon which or by which an embodiment is implemented.

Processor-based system 1000 is programmed to determine a video playback position and cause augmented imagery to be displayed, as described herein, and includes, for example, bus 1001, processor 1003, and memory 1005 components.

In some embodiments, the processor-based system is implemented as a single "system on a chip." Processor-based system 1000, or a portion thereof, constitutes a mechanism for performing one or more operations of determining a video playback position and causing augmented imagery to be displayed.

In some embodiments, the processor-based system 1000 includes a communication mechanism such as bus 1001 for transferring and/or receiving information and/or instructions among the components of the processor-based system 1000. Processor 1003 is connected to the bus 1001 to obtain instructions for execution and process information stored in, for example, the memory 1005. In some embodiments, the processor 1003 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1003. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the first processor (or multiple processors) 1003 performs a set of operations on information as specified by a set of instructions stored in memory 1005 related to determining a video playback position and causing augmented imagery to be displayed. The execution of the instructions causes the processor to perform specified functions.

The processor 1003 and accompanying components are connected to the memory 1005 via the bus 1001. The memory 1005 includes one or more of dynamic memory (e.g., RAM, magnetic disk, writable optical disk, etc.) and static memory (e.g., ROM, CD-ROM, etc.) for storing executable instructions that when executed perform the operations described herein to facilitate determining a video playback position and causing augmented imagery to be displayed. The memory 1005 also stores the data associated with or generated by the execution of the operations.

In one or more embodiments, the memory 1005, such as a random-access memory (RAM) or any other dynamic storage device, stores information including processor instructions for determining a video playback position and causing augmented imagery to be displayed. Dynamic memory allows information stored therein to be changed. RAM allows a unit of information stored at a location called a memory address to be stored and retrieved independently of information at neighboring addresses. The memory 1005 is also used by the processor 1003 to store temporary values during execution of processor instructions. In various embodiments, the memory 1005 is a read only memory (ROM) or any other static storage device coupled to the bus 1001 for storing static information, including instructions, that is not capable of being changed by processor 1003. Some memory is composed of volatile storage that loses the information stored thereon when power is lost. In some embodiments, the memory 1005 is a non-volatile (persistent) storage device, such as a magnetic disk, optical disk, or flash card, for storing information, including instructions, that persists even when the system 1000 is turned off or otherwise loses power.

The term "computer-readable medium" as used herein refers to any medium that participates in providing information to processor 1003, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to a method comprising processing live image data captured by a camera associated with a first device. The live image data is displayed by the first device. A video displayed by a second device is viewable within the live image data displayed by the first device. The live image data is processed to identify a spatial position of the video displayed with respect to the camera associated with the first device within the live image data captured by the camera. The live image data is processed to identify a known frame of the video displayed by the second device. The method also comprises causing augmented imagery to be displayed by the first device in a display area of the first device within which the live image data is displayed concurrently with the video displayed by the second device. The augmented imagery is displayed in the display area of the first device based on the identified spatial position of the video displayed with respect to the camera associated with the first device within the live image data captured by the camera, and in response to the known frame.

Another aspect of this description is related to apparatus comprising a processor and a memory having instructions stored thereon that, when executed by the processor, cause the apparatus to process live image data captured by a camera associated with a first device. The live image data is displayed by the first device. A video displayed by a second device is viewable within the live image data displayed by the first device. The live image data is processed to identify a spatial position of the video displayed with respect to the camera associated with the first device within the live image data captured by the camera. The live image data is processed to identify a known frame of the video displayed by the second device. The apparatus is also caused to cause augmented imagery to be displayed by the first device in a display area of the first device within which the live image data is displayed concurrently with the video displayed by the second device. The augmented imagery is displayed in the display area of the first device based on the identified spatial position of the video displayed with respect to the camera associated with the first device within the live image data captured by the camera, and in response to the known frame.

Another aspect of this description is related to a non-transitory computer readable medium having instructions stored thereon that, when executed by a processor, cause an apparatus to process live image data captured by a camera associated with a first device. The live image data is displayed by the first device. A video displayed by a second device is viewable within the live image data displayed by the first device. The live image data is processed to identify a spatial position of the video displayed with respect to the camera associated with the first device within the live image data captured by the camera. The live image data is processed to identify a known frame of the video displayed by the second device. The apparatus is also caused to cause augmented imagery to be displayed by the first device in a display area of the first device within which the live image data is displayed concurrently with the video displayed by the second device. The augmented imagery is displayed in the display area of the first device based on the identified spatial position of the video displayed with respect to the camera associated with the first device within the live image data captured by the camera, and in response to the known frame.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Although features of the present disclosure are expressed in certain combinations, it is contemplated that these features can be arranged in any combination and order without departing from the spirit and scope of the present disclosure.

What is claimed is:

1. A method, comprising:
processing live image data captured by a camera associated with a first device, wherein the live image data is displayed by the first device, a video displayed by a second device is viewable within the live image data displayed by the first device, the live image data is processed to identify a spatial position of the video displayed with respect to the camera associated with the first device within the live image data captured by the camera, and the live image data is processed to identify a known frame of the video displayed by the second device; and
causing augmented imagery to be displayed by the first device in a display area of the first device within which the live image data is displayed concurrently with the video displayed by the second device, wherein the augmented imagery is displayed in the display area of the first device based on the identified spatial position of the video displayed with respect to the camera associated with the first device within the live image data captured by the camera, and in response to the known frame.

2. The method of claim 1, wherein the augmented imagery is displayed by the first device so as to appear between the video displayed by the second device and the first device.

3. The method of claim 1, wherein the augmented imagery is displayed by the first device so as to appear behind the video displayed by the second device such that the video displayed by the second device is between the augmented imagery and the first device.

4. The method of claim 1, wherein the augmented imagery is displayed by the first device so as to appear as being on the video displayed by the second device.

5. The method of claim 1, wherein the processing of the live image data to identify the spatial position of the video displayed with respect to the camera associated with the first device within the live image data captured by the camera, comprises:
identifying one or more points in a candidate frame of the video displayed by the second device;
comparing the one or more points in the candidate frame to a plurality of points in a database of known points corresponding to known video clips comprising a plurality of known frames; and
identifying the known frame within the video displayed by the second device based on a matching of the one or more points in the candidate frame of the video displayed by the second device and the plurality of points in the database of known points corresponding to the known video clips comprising the plurality of known frames.

6. The method of claim 5, further comprising:
detecting a boundary of the candidate frame in the live image data captured by the camera;
cropping the candidate frame from the live image data captured by the camera to generate a cropped frame image; and
processing the cropped frame image to identify the known frame.

7. The method of claim 6, further comprising:

de-warping the cropped frame image before processing the cropped frame image.

8. The method of claim 1, wherein the augmented imagery is further caused to be displayed in response to a playback position in the video displayed by the second device, wherein the playback position is based on the known frame.

9. The method of claim 8, wherein the playback position is an estimated playback position in the video displayed by the second device, the estimated playback position is based on a continuously transformed state of the video displayed by the second device, the continuously transformed state corresponds to a time in the playback of the video displayed by the second device, and the continuously transformed state is based on a plurality of past states in a table of past states ranging from an oldest past state to a newest past state.

10. The method of claim 9, wherein the table of past states is maintained outside a neural network that generates the continuously transformed state and the estimated playback position, and the method further comprises:

causing one or more of the plurality of past states in the table of past states to be supplied to the neural network for determining a latest state based on the known frame;

causing the neural network to generate the estimated playback position; and causing the latest state to be added to the table of past states as the newest past state.

11. An apparatus, comprising:

a processor; and a memory having instructions stored thereon that, when executed by the processor, cause the apparatus to:

process live image data captured by a camera associated with a first device, wherein the live image data is displayed by the first device, a video displayed by a second device is viewable within the live image data displayed by the first device, the live image data is processed to identify a spatial position of the video displayed with respect to the camera associated with the first device within the live image data captured by the camera, and the live image data is processed to identify a known frame of the video displayed by the second device; and cause augmented imagery to be displayed by the first device in a display area of the first device within which the live image data is displayed concurrently with the video displayed by the second device, wherein the augmented imagery is displayed in the display area of the first device based on the identified spatial position of the video displayed with respect to the camera associated with the first device within the live image data captured by the camera, and in response to the known frame.

12. The apparatus of claim 11, wherein the augmented imagery is displayed by the first device so as to appear between the video displayed by the second device and the first device.

13. The apparatus of claim 11, wherein the augmented imagery is displayed by the first device so as to appear behind the video displayed by the second device such that the video displayed by the second device is between the augmented imagery and the first device.

14. The apparatus of claim 11, wherein the augmented imagery is displayed by the first device so as to appear as being on the video displayed by the second device.

15. The apparatus of claim 11, wherein to process the live image data to identify the spatial position of the video displayed with respect to the camera associated with the first device within the live image data captured by the camera, the apparatus is caused to:

identify one or more points in a candidate frame of the video displayed by the second device;

compare the one or more points in the candidate frame to a plurality of points in a database of known points corresponding to known video clips comprising a plurality of known frames; and identify the known frame within the video displayed by the second device based on a matching of the one or more points in the candidate frame of the video displayed by the second device and the plurality of points in the database of known points corresponding to the known video clips comprising the plurality of known frames.

16. The apparatus of claim 15, wherein the apparatus is further caused to:

detect a boundary of the candidate frame in the live image data captured by the camera;

crop the candidate frame from the live image data captured by the camera to generate a cropped frame image; and process the cropped frame image to identify the known frame.

17. The apparatus of claim 16, wherein the apparatus is further caused to:

de-warp the cropped frame image before processing the cropped frame image.

18. The apparatus of claim 11, wherein the augmented imagery is further caused to be displayed in response to a playback position in the video displayed by the second device, wherein the playback position is based on the known frame.

19. The apparatus of claim 18, wherein the playback position is an estimated playback position in the video displayed by the second device, the estimated playback position is based on a continuously transformed state of the video displayed by the second device, the continuously transformed state corresponds to a time in the playback of the video displayed by the second device, and the continuously transformed state is based on a plurality of past states in a table of past states ranging from an oldest past state to a newest past state.

20. A non-transitory computer readable medium having instructions stored thereon that, when executed by a processor, cause an apparatus to:

process live image data captured by a camera associated with a first device, wherein the live image data is displayed by the first device, a video displayed by a second device is viewable within the live image data displayed by the first device, the live image data is processed to identify a spatial position of the video displayed with respect to the camera associated with the first device within the live image data captured by the camera, and the live image data is processed to identify a known frame of the video displayed by the second device; and cause augmented imagery to be displayed by the first device in a display area of the first device within which the live image data is displayed concurrently with the video displayed by the second device, wherein the augmented imagery is displayed in the display area of the first device based on the identified spatial position of the video displayed with respect to the camera associated with the first device within the live image data captured by the camera, and in response to the known frame.

* * * * *